United States Patent [19]
Yang

[11] Patent Number: 6,165,919
[45] Date of Patent: Dec. 26, 2000

[54] CROSSLINKING AGENTS OF CELLULOSIC FABRICS

[75] Inventor: Charles Qixiang Yang, Athens, Ga.

[73] Assignee: University of Georgia Research Foundation, Inc., Athens, Ga.

[21] Appl. No.: 08/783,487

[22] Filed: Jan. 14, 1997

[51] Int. Cl.$^7$ ....................................................... B32B 9/04
[52] U.S. Cl. .......................... 442/153; 442/154; 442/165; 428/507; 524/500; 524/502
[58] Field of Search ..................................... 442/153, 154, 442/165; 428/511, 507; 524/500, 502

[56] References Cited

U.S. PATENT DOCUMENTS 5,549,791  8/1996  Herron et al. ......................... 162/157.6

FOREIGN PATENT DOCUMENTS

WO 95/34710  12/1995  WIPO .

Primary Examiner—Terrel Morris
Assistant Examiner—John J. Guarriello
Attorney, Agent, or Firm—Woodcock Washburn Kurtz Maciewicz & Norris LLP

[57] ABSTRACT

Cellulosic materials such as cotton fabrics and paper are crosslinked with a composition comprising (A) polymers of ethylenically unsaturated polycarboxylic acid monomers or salts thereof, the monomers having one or more dicarboxylic groups wherein the carboxyl groups are on adjacent carbon atoms; (B) saturated $\alpha$-hydroxypolycarboxylic acids or salts thereof; and (C) one or more curing catalysts, and heated to produce esterification and crosslinking of the celluose by reaction of the cellulosic hydroxyl groups with carboxyl groups in the reaction product of (A) and (B).

23 Claims, No Drawings

CROSSLINKING AGENTS OF CELLULOSIC FABRICS

FIELD OF THE INVENTION

This invention relates to methods of treating cellulosic materials with formaldehyde-free compositions, the formaldehyde-free compositions, and the materials so treated.

BACKGROUND OF THE INVENTION

The physical characteristics of cellulosic materials such as fabrics and paper can often be enhanced by chemical treatment which causes crosslinking of cellulose molecules. In the case of fabrics, such treatments can provide wrinkle resistance, shrinkage resistance, smooth drying and crease retention properties and in the case of paper, improved wet strength.

Treatments with formaldehyde-based reagents, such as dimethyloldihydroxylethyleneurea (DMDHEU), have been used in the past to impart these valuable characteristics on cellulosic fabrics because the formaldehyde-based reagents are relatively inexpensive and effective. Urea-formaldehyde and melamine-formaldehyde reagents are used as wet strength agents to enhance the wet performance of paper. However, formaldehyde is an irritant and a known carcinogen. In addition, cellulosic fabrics treated with formaldehyde-based reagents suffer severe strength loss.

Thus, finding non-formaldehyde crosslinking agents for cellulosic fabrics has been the focus of the textile finishing industry since the mid-1980's. Polycarboxylic acids are among the new crosslinking agents studied. A number of polycarboxylic acids have been effective as durable press finishing agents.

For instance, 1,2,3,4-butanetetracarboxylic acid (BTCA) provides effective crosslinking for cellulosic textiles thereby imparting high levels of wrinkle resistance and laundering durability. While there have been extensive efforts to use BTCA as a non-formaldehyde durable press finishing agent to replace traditional formaldehyde-based reagents, the prohibitively high cost of BTCA has prevented its commercial scale application in the textile industry.

While it is known that polycarboxylic acids having their carboxyl groups bonded to adjacent carbons of the molecular backbone are more effective for esterifying cellulose than polycarboxylic acids with carboxyl groups bonded to alternative carbons; such polycarboxylic acids are not as effective as needed for commercial purposes.

Citric acid has also been tested as a crosslinking agent for cellulosic fabrics. However, the fact that citric acid is only moderately effective coupled with poor laundering durability and fabric yellowing makes the use of citric acid undesirable.

A cost effective non-formaldehyde crosslinker which provides both satisfactory crosslinking and good fabric strength retention is greatly needed. The present invention satisfies this need. The Applicant has discovered a unique combination of relatively low priced polymeric carboxylic acids and α-hydroxypolycarboxylic acids which, when reacted in situ in the presence of a catalyst, provides superior cellulosic crosslinking as well as strength retention for cellulosic fabrics. Treatment of paper with the combination of polymeric carboxylic acids and α-hydroxy polycarboxylic acids also significantly improves the wet performance of the treated paper.

SUMMARY OF THE INVENTION

In one aspect of the present invention is provided crosslinked cellulosic materials wherein cellulosic hydroxyl groups of the material are esterified with carboxylic groups resulting from in situ reaction of (A) polymers of ethylenically unsaturated polycarboxylic acid monomers or salts thereof, the monomers having one or more dicarboxylic groups in which the carboxyl groups reside on adjacent carbon atoms; and (B) saturated α-hydroxypolycarboxylic acid, or salts thereof.

In another aspect of the invention is provided water dispersible treating solutions or dry mixtures for cellulosic materials comprising (A) polymers of ethylenically unsaturated polycarboxylic acid monomers or salts thereof, the monomers having one or more dicarboxylic groups wherein the carboxyl groups are on adjacent carbon atoms; and (B) saturated α-hydroxypolycarboxylic acid or salts thereof. A curing catalyst (C) is also present in solution or dry mixture, or may be added to a treating solution at the time of treatment.

In yet another aspect of the invention is provided processes for treating cellulosic materials comprising contacting a cellulosic material which contains hydroxyl groups with a composition comprising (A) polymers of ethylenically unsaturated polycarboxylic acid monomers or salts thereof, the monomers having one or more dicarboxylic groups in which the carboxyl groups reside on adjacent carbon atoms; (B) saturated α-hydroxypolycarboxylic acid or salts thereof; and (C) a curing catalyst; and heating the material to produce a reaction between the saturated acid(B) and the polymers (A), and esterification and crosslinking of the hydroxyl groups of the cellulosic textile material. The invention further includes cellulosic materials treated by such processes.

DETAILED DESCRIPTION OF PREFERRED EMBODIMENTS

The present invention is based upon the surprising finding that under the curing conditions of treated cellulosic fabrics, polymers of ethylenically unsaturated polycarboxylic acid monomers or salts thereof, the monomers having one or more dicarboxylic groups in which the carboxyl groups reside on adjacent carbons, referred to herein as polycarboxylic acid polymers (A), will react with (B) saturated α-hydroxypolycarboxylic acids in situ, to synergistically improve the wrinkle resistance of the cellulosic fabrics and to improve the properties of other cellulosic materials such as paper products.

By themselves, polycarboxylic acid polymers (A) of the present invention react with hydroxyl groups of cellulosic materials. However, in order for a reaction with cellulose to occur, the polycarboxylic acid polymer (A) must have sufficient mobility to react with the hydroxyl groups of the cellulose. In larger polymeric polycarboxylic acids, mobility is lacking or decreases as ester linkages are formed between the polycarboxylic acid polymer and the cellulosic hydroxyl groups, imparting less than optimal durable press finish to fabric.

α-Hydroxypolycarboxylic acids (B) also react with cellulosic hydroxyl groups. However, it has been observed that the α-hydroxyl group hinders esterification of the cellulosic hydroxyl groups by the polycarboxylic acid.

While not wishing to be bound by any particular theory, it is believed that the reaction which contributes to the synergistic results achieved by the present invention is as shown in exemplary reaction Scheme I below, in which A' is a representative polycarboxylic acid polymer (A) of the invention and B' is a representative α-hydroxypolycarboxylic acid (B) of the invention.

SCHEME I

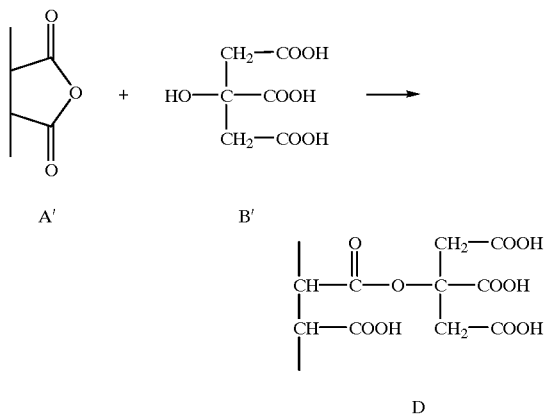

Thus, an α-hydroxy polycarboxylic acid such as citric acid (B') is converted from a trifunctional material to a tetrafunctional state (D) by reaction with a polycarboxylic acid polymer (A') and results in forming a more flexible branched crosslinker (D) for cellulosic materials, thereby significantly enhancing, in the case of fabrics, durable press performance as well as mechanical strength.

The present invention is applicable to fibrous cellulosic materials including cotton, flax, jute, hemp, ramie and regenerated unsubstituted wood celluloses such as rayon. The disclosed processes may be applied to fibrous cellulosic material in the form of woven fabric, non-woven sheets or webs or knit fabrics, and to fibers, yarns or filaments. The present invention is also applicable to paper products such as produced from wet cellulose pulp, including stationery and paper board products, cartons and casing materials, and high endurance papers such as currency stock. The disclosed processes are particularly useful with materials containing no less than 30% cellulosic fiber; preferably the materials contain from about 50 to 100% cotton.

As indicated, polymers (A) of the present invention are based on dicarboxylic acid monomers having one or more dicarboxylic groups in which the carboxyl groups reside on adjacent carbon atoms. The polymeric polycarboxylic acids (A) optionally may have one or more non-adjacent carboxyl groups or non-carboxyl active hydrogen groups. Such non-carboxyl groups include hydroxyl, primary amino, secondary amino, thiol, and combinations thereof.

Such polymeric polycarboxylic acids (A) are addition polymers prepared from at least one of maleic and fumaric acids, or the anhydrides thereof, alone or in combination with one or more other monomers copolymerized therewith, such as acrylic acid, methacrylic acid, crotonhc acid, itaconic acid, aconitic acid (and their esters), acrylonitrile, acrylamide, vinyl acetate, styrene, α-methylstyrene, methyl vinyl ketone, vinyl alcohol, acrolein, ethylene and propylene. Polymers of polycarboxylic acids useful in the present invention and methods of making the same are described, for example, in U.S. Pat. Nos. 3,810,834, 4,126,549 and 5,427,587. In a preferred embodiment the polycarboxylic acid polymer (A) is the hydrolysis product of a homopolymer of maleic anhydride. In other embodiments of the invention the polycarboxylic acid polymer (A) is a hydrolysis product derived from a copolymer of maleic anhydride and one or more other monomers. For instance, a hydrolysis product of a terpolymer of maleic anhydride, vinyl acetate and ethyl acrylate is preferred. In some embodiments of the present invention the molar ratio of maleic anhydride to the other monomers is in the range of about 2.5:1 to 9:1.

Preferably, polymeric polycarboxylic acids (A) of the invention have the formula:

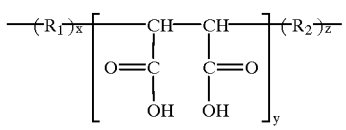

wherein R1 and R2 independently are H, C1–C5 alkyl, substituted or unsubstituted, or aryl, and x and z are positive rational numbers or 0, y is a positive rational number and x+y+z=1. In some aspects of the invention, y is greater than 0.5, i.e. greater than 50% of polymer (A). Where a lower density of carboxyl groups is desired to increase the mobility of the anhydride group, y may preferably be less than 0.9, i.e. 90% of polymer (A). A suitable range of y, therefore, is about 0.5 to 0.9. Alkyl, as used herein refers to saturated, unsaturated, branched and unbranched alkyls. Substituents on alkyl or elsewhere in polymer (A) include, but are not limited to carboxyl, hydroxy, alkoxy, amino, and alkylthiol substituents.

Polymers (A) of the present invention have number average molecular weights of from about 400 to about 1,000,000 although certain molecular weights are more suitable for use with particular cellulosic substrates as would be appreciated by one skilled in the art. Polymers having a number average molecular weight of from 400 to 4,000 are preferred for use with cellulosic textiles. Polymers having number average molecular weights in the range of from about 40,000 to about 1,000,000, are more suitable for paper-type cellulosic substrates.

The saturated α-hydroxypolycarboxylic acid (B) comprises at least two carboxyl groups bonded to adjacent carbons. In preferred embodiments the carboxylic acid comprises one or more C2–C9 polycarboxylic acids each containing at least two carboxyl groups or as many as four or more. Examples of such α-hydroxy-polycarboxylic acids include, but are not limited to, citric acid, malic acid and tartrate monosuccinic acid having the formula:

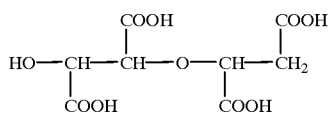

In some cases, in order to raise the pH of the treating solution to improve compatibilty of the bath or additives and/or for improved strength retention, a portion of one or both of components (A) and (B) may be used in salt form, especially as a water soluble salt. Suitable for this purpose are alkali metal salts of the components. Alternatively, or in combination with use of either of components (A) and (B) in salt form, the pH of the treating solution may be raised, or the solution partially neutralized, by the addition of a base, preferably a water soluble base, such as an alkali metal hydroxide, ammonium hydroxide or an amine. The pH may be elevated for such purpose to about 2.3 to about 5, preferably about 2.5 to 4. However, if the treating solution is to be used at relatively high concentration, eg., at about 10–30% solids, it is preferred to form the treating solution with the acid forms of components (A) and (B), or at least with the acid form of component (A), and then raise the pH, if desired, of the treating solution in the manner described. The reason is that the salts, at least the salt of component (A), may precipitate at high concentrations. This tendency (which is greater for salts of component (A) than for component (B)), decreases as the treating solution is diluted.

It is understood that some loss of wrinkle resistance of the end product may result from elevation of the pH and use of either or both of components (A) and (B) in salt form. However, such loss may be acceptable if other significant properties are retained or improved, such as strength and resistance to tear.

The weight ratio of polymeric ethylenically unsaturated carboxylic acid (A) or salt to α-hydroxypolycarboxylic acid compounds (B) is generally 1:0.1 to 1:20, preferably 1:3 to 1:5.

Catalysts (C) of the present invention are compounds with a molecular weight of less than 1000 such as, for example, alkali metal hypophosphite salts, alkali metal phosphites, alkali metal polyphosphates, alkali metal dihydrogen phosphates, alkali metal phosphate, alkali metal hydrogen phosphate, polyphosphoric acids, hypophosphorous acids, phosphorous acids, alkyl phosphinic acids and any mixture of two or more thereof. The curing catalyst may also be an oligomer or polymer bearing phosphorous-containing groups such as, for example, addition polymers of acrylic and/or maleic acids formed in the presence of sodium hypophosphite addition polymers prepared from ethylenically unsaturated monomers in the presence of phosphorous salt chain transfer agents or terminators, and addition polymers containing acid functional monomer residues such as, for example, copolymerized phosphoethyl methacrylate, and similar phosphinic acid esters, and copolymerized vinyl sulfonic acid monomers and their salts as described in U.S. Pat. Nos. 4,820,307 and 5,427,587. Mixtures of two or more such catalysts are also envisioned in some aspects of the invention. Particularly preferred in some aspects of the invention is sodium hypophosphite.

The catalyst (C) may be used at a level of from about 2% to about 100%, by weight based on the combined weight of polymeric polycarboxylic acid and α-hydroxypolycarboxylic acid. Preferred levels of catalyst (C) are 10% to about 60% by weight based on the combined weight of polymeric polycarboxylic acid (A) and α-hydroxypolycarboxylic acid (B).

As indicated, components (A), (B) and catalyst (C) may be admixed using conventional mixing techniques dispersing in an aqueous medium to form a solution or to form a dry blend.

The solution or blend may contain, in addition, conventional treatment components such as, for example, fabric softeners, wetting agents, emulsifiers, anti-migration acids and biocides.

The processes of the present invention are carried out by first contacting the cellulosic material, such as fabric, with a treating solution containing polymeric polycarboxylic acid (A), α-hydroxypolycarboxylic acid (B) and one or more curing catalysts (C). The cellulosic material may optionally be contacted with solvent, and optional additives such as fabric softeners, wetting agents, and/or other additives. The application may be effected, for instance, by padding, saturating, spraying, or the like. For example, cellulosic fabric may be immersed in a bath of treating solution. The solvent used to form the solution is preferably water, although any inert volatile solvent in which polymeric polycarboxylic acid (A), α-hydroxypolycarboxylic acid (B) and one or more curing catalysts (C) are soluble or uniformly dispersible can be used. The fabric softeners are emulsified nonionic or ionic materials such as polyethylene and/or silicone softeners.

After being thoroughly wet in the treating bath, the cellulosic material is passed between squeeze rolls or spun to remove excess liquid, and oven-dried at any convenient temperature sufficient to remove the solvent within the desired time. The material is then oven cured at from about 130°–210° C. for about 5 seconds to 30 minutes.

One skilled in the art would appreciate that the curing time and temperature is partly dependent upon the thickness of the material to be cured. For example, sheet-thickness fabric may be cured by heating for from about 30 seconds to 2 minutes at from about 150 to 210° C. for the reaction between the polycarboxylic acid polymer (A) and (α-hydroxypolycarboxylic acid (B) to occur as well as cellulose esterification and crosslinking. Thicker fabric may require longer heating at higher temperatures. Thicker fabrics may preferably be oven cured at about 150–190° C. for about 1.0–15.0 minutes and most preferably cured at about 160–185° C. for about 1.0–15.0 minutes to cause a reaction between the polycarboxylic acid polymer (A) and α-hydroxypolycarboxylic acid (B) and esterification and crosslinking of the cellulose to occur. This procedure is also useful where material is cured at a later time, with or without forming into a particular configuration.

If desired, the cured material may subsequently be given a water rinse to remove unreacted reagent and curing catalyst, and may then be redried.

Where the product is discolored, the material may be treated by impregnating the material with an aqueous solution containing from 0.5% to 5% by weight of a decolorizing agent such as magnesium monoperoxyphthalate, sodium perborate, sodium tetraborate, boric acid, sodium borohydride or sodium hypochlorite. The material is immersed in the solution of decolorizing agent and soaked for 5 to 120 minutes at ambient temperature or if necessary in such a solution warmed to a temperature not exceeding 60° C. The material is subsequently rinsed with water to remove excess chemicals and solubilized colored products, and then dried.

Cellulosic fabrics treated in this manner may be used for durable-press clothing. The present invention may also be used to prepare improved corrugated board, boxes and other paper products and sanitary items comprising individualized cellulosic fibers.

EXAMPLES

The following examples are illustrative and are not meant to be limiting of the present invention. Throughout this specification and claims, all parts and percentages are by weight unless otherwise indicated.

Materials

The cotton fabric used for the pre-cure and post-cure finishing was a 3×1 twill weave 100% cotton fabric (8 oz per square yard) dyed with a vat dye (S/5570 C/45551 Khaki), and provided by Miliken, Blacksburgh, S.C. The cotton fabric used for the garment finishing was a Excalibur twill 100% cotton fabric, style WHTW, dyed with a vat dye (9119 Khaki), and provided by Mt. Vernon Mill, Trion, Ga. The kraft paper (74 g/M$^2$) was produced by Georgia Pacific. Poly(maleic acid) (PMA) and terpolymer of maleic acid, ethyl acrylate and vinyl acetate (5:1:1 mole ratio) (TPMA) were supplied by FMC Corporation and are aqueous solutions with approximately 50% solids content having number average molecular weights in the ranges of about 800–1000 and about 1200–1500, respectively. The carboxyl concentration of a TPMA solution was determined by acid-base titration. TPMA was determined to have 5.56 mmole carboxyl per gram and 34.7% active ingredient concentration (w/w). A list of names and manufacturers of the reagents is provided in Table 1.

TABLE 1

Names and Manufacturers of Reagents

| Name | Description | Manufacturer |
| --- | --- | --- |
| terpolymer of maleic acid (TPMA) | co-crosslinking agent | FMC Corporation |
| citric acid (CA) | co-crosslinking agent | ADM |
| 1,2,3,4-butane-tetracarboxylic acid (BTCA) | crosslinking agent | Aldrich (Milwallkee, Wisconsin) |
| Permafresh EFC | pre-catalyzed DMDHEU-based durable press finish system | Sequa (Chester, South Carolina) |
| NaH$_2$PO$_2$.H$_2$O | catalyst | Occidental Chemical |
| Discores LFR | self-catalyzed DMDHEU-based durable press finish system | Callaway Chemical (Columbus, Georgia) |
| Mykon HD | high density polyethylene fabric softener | Sequa Chemicals (Chester, South Carolina) |
| Discosoft NIP | high density polyethylene fabric softener | Callaway Chemicals (Columbus, Georgia) |
| Protosil NYS | silicone-based fabric softener | Sybron (Wellford, South Carolina) |
| Discosoft WRS | silicon-based fabric softener | Callaway Chemicals (Columbus, Georgia) |
| Wet 16 | wetting agent | Sequa Chemicals (Chester, South Carolina) |
| Callaterge CNN | wetting agent | Callaway Chemicals (Columbus, Georgia) |
| glycerine | softener | Aldrich (Milwallkee, Wisconsin) |
| Na$_3$PO$_4$.12H$_2$O | pH adjuster | Aldrich (Milwallkee, Wisconsin) |

Fabric Treatment
Pre-Cure Finishing

The cotton fabric was first impregnated in a finish bath containing the crosslinking agents, the catalyst, a wetting agent, and fabric softeners. Trisodium phosphate was used to adjust the finish bath pH. The impregnated fabric sample was pressed between the squeezing rolls of a Cromax laboratory padder using a known two-dips-two-nips process. The wet pick-up of the impregnated fabric was in the range of 70–77%. The fabric was dried at 85° C. for 5 min, and finally cured in a Mathis curing oven.

The treated cotton fabric was cured at 185° C. for 3 minutes unless otherwise noted.

Garment Finishing

The cotton fabric was cut and sewed into 30×9 inch pant legs. Approximately 15 pounds of garment was added to an Unimac machine filled with the finish solution. The machine was run for 8 min, then the solution was drained for 1 min. The impregnated garment was extracted for 37 sec to maintain ~70% wet pick-up. The treated garment was tumble dried in a 50-pound Huebsch commercial dryer for 12 min to achieve ~13% moisture content. The garment was pressed in a professional steam press equipment using a long cycle. The garment was finally cured in a Despath model LT2–12 curing oven at specified temperatures.

Paper Treatment

The paper was first cut into 25 cm×25 cm sheets. Each sheet was soaked in a solution containing an acid and the catalyst (sodium hypophosphite) with a 2:1 (W/W) acid-to-catalyst ratio. The soaked paper was pressed between two squeezing rolls at 40 psi to remove the excess solution, then dried on a drum dryer at 80° C. to prevent curling. The sheet thus treated was cured in a forced draft oven, then rinsed in water for 15 min to remove the unreacted acid and catalyst, and finally dried at 80° C.

Fabric Performance Evaluation

Conditioned wrinkle recovery angle (WRA), durable press (DP) rating, tensile strength, tearing strength, and flex abrasion-resistance of the finished cotton fabric were evaluated according to the following standard methods: WAR: AATCC Test Method 66-1990; DP rating: AATCC Test Method 124-1992; tensile strength: ASTM Test Methods D5035-90; tearing Strength: ASTM Test Method D1424-83; and abrasion resistance: ASTM Test Method D3885-92. All the fabric properties were evaluated after one home laundering washing/drying (HLWD) cycle. The performance of the finished fabric was also evaluated after different numbers of home laundering washing/drying cycles. The home laundering washing process was conducted according to AATCC standard method 124-1992.

Paper Performance Evaluation

The dry tensile strength, wet tensile strength, wet stiffness and folding endurance (MIT tester) of paper were evaluated according to the following TAPPI standard methods: T404 om-87, T456 0m-87, T 489 om-86, and T511 om-88, respectively. The mechanical properties described above were measured at the paper machine direction. The dimension stability (DS) was measured for the cross machine direction. A paper strip of 1.5 cm×10 cm was conditioned under 50% relative humidity for 24 hr, then the length of the strip was measured. The strip was soaked in water for 24 hr, then the length of the water-soaked strip was measured. The linear dimensional change (L) was calculated by subtracting the length of the strip before soaking from the length of the strip after soaking. The dimension stability was calculated using the following formula:

$$DS=[(L_u-L_t)/L_u]\times 100\%$$

where $L_u$ and $L_t$ are linear dimension changes of the paper strip not treated and the strip treated with a acid solution. 10 specimen were used to obtain an average of the DS of one paper sample.

Performance of New Durable Press Finish: Pre-Cure finishing

The formulation of the finish bath with different maleic acid terpolymer/citric acid ratios is shown in Table 1. Each of the finishing solutions have a carboxyl concentration approximately equivalent to that of 8% CA. The carboxyl concentration of TPMA was determined by acid-base titration. Cotton fabric is treated with the finish solutions in the presence of 4% $NaH_2PO_2$.

The performance of fabric finished with the solutions of Table 2 is shown in Table 3. The data indicate that the finish solution with a 1:4.5 TPMA/CA carboxyl mole ratio (17/83 weight ratio) provides the highest WRA as well as good strength retention.

TABLE 2

Fabric Finish Solutions

| Sample | TPMA/CA (COOH mole ratio) | CA carboxyl mole % | CA weight percentage (%) |
|---|---|---|---|
| A1 | 1:0 | 0 | 0 |
| A2 | 1:0.5 | 33 | 34 |
| A3 | 1:1 | 50 | 51 |
| A4 | 1:2 | 67 | 68 |
| A5 | 1:3 | 75 | 76 |
| A6 | 1:3.5 | 78 | 79 |
| A7 | 1:4 | 80 | 81 |
| A8 | 1:4.5 | 82 | 83 |
| A9 | 1:5 | 83 | 84 |
| A10 | 0:1 | 100 | 100 |

TABLE 3

WRA, Tearing Strength Retention and Tensile Strength Retention of Dyed Cotton Fabric

| Sample | TPMA/CA COOH mole ratio | WRA (degree) (W + F) | Tearing Strength (%) W | Tearing Strength (%) F | Tensile Strength (%) W | Tensile Strength (%) F |
|---|---|---|---|---|---|---|
| A1 | 1:0 | 243 | 59 | 46 | 76 | 56 |
| A2 | 1:1 | 255 | 57 | 43 | 70 | 49 |
| A3 | 1:2 | 247 | 58 | 44 | 66 | 44 |
| A4 | 1:3 | 157 | 56 | 43 | 65 | 44 |
| A5 | 1:3.5 | 259 | 56 | 42 | 66 | 46 |
| A6 | 1:4 | 257 | 56 | 42 | 64 | 47 |
| A7 | 1:4.5 | 261 | 56 | 43 | 67 | 48 |
| A8 | 1:5 | 253 | 56 | 44 | 64 | 46 |
| A9 | 0:1 | 258. | 57 | 43 | 66 | 43 |
| CONTROL | 0 | 162 | 100 | 100 | 100 | 100 |

Comparison of TPMA/CA with BTCA and DMDHEU without Softeners

A comparison of new durable press finishing system with BTCA and DMDHEU is provided in Table 4. As shown in Table 4, TPMA provides better WRA and fabric strength than DMDHEU and comparable WRA and fabric strength to BCTA.

TABLE 4

Formulation of the Finish Baths and Performance of the Cotton Fabric Finished with Different Finish systems

| Sample | Finishing System | Total Finish Concentration (%, owf) | Catalyst Concentration (%, owf) | Curing Temperature (° C.) | Curing Time (min) | WRA (W + F) degree | Tearing Strength Retention (%) W | Tearing Strength Retention (%) F | Tensile Strength retention (%) W | Tensile Strength retention (%) F |
|---|---|---|---|---|---|---|---|---|---|---|
| B1 | TPMA/CA (pH 2.11)[A] | 8.0 | 4.0 | 185 | 3.0 | 264 | 52 | 41 | 68 | 42 |
| B2 | TPMA/CA (pH = 2.45)[A] | 8.0 | 4.0 | 185 | 3.0 | 262 | 51 | 42 | 66 | 50 |
| B3 | BTCA | 6.2 | 4.0 | 180 | 1.5 | 262 | 60 | 47 | 63 | 44 |
| B4 | DMDHEU | 8.0 | self-catalyzed | 170 | 3.0 | 234 | 36 | 31 | 43 | 31 |

[A]The TPMA/CA formulations maintain 1:4.5 TPMA-to-CA carboxyl mole ratio. $Na_3PO_4$ was used to adjust the pH of the TPMA/CA solutions to 2.45. $NaH_2PO_2$ was used as a catalyst for both TPMA/CA and BTCA.
[B]Permafresh EFC (a self-catalyzed durable press finish) was used for, the DMDHEU system.

Effects of Addition of Fabric Softener

Performance of the cotton fabric treated with the TPMA/CA system was compared with that treated with DMDHEU in the presence of fabric softeners and a wetting agent. The pH of the TPMA/CA system is adjusted by trisodium phosphate to 2.4 and 2.7. The finish formulations for the TPMA/CA, the BTCA, and the DMDHEU systems are summarized in Table 5.

The curing temperature, curing time, WRA, DP rating, tensile strength retention, tearing strength retention, and flex abrasion resistance of the cotton fabric finished with the different systems are summarized in Table 6. It can be seen that the two fabric samples finished with the TPMA/CA formulations of pH 2.4 and 2.7 have significantly higher WRA and DP rating than that finished with the DMDHEU system, while the tensile strength and tearing strength of the fabric finished with TPMA/CA are comparable to that finished with DMDHEU. The TPMA/CA finish with pH value of 2.7 provides higher fabric tensile and tearing strength than the same finish with pH value of 2.4. The flex abrasion resistance of the fabric finished with TPMA/CA (pH=2.7) is comparable to that treated with DMDHEU.

The tensile strength retention, tearing strength retention and flex abrasion resistance of the finished cotton fabric after 30 home laundering washing/drying (HLWD) cycles are presented in Table 7. One observes that after 30 HLWD cycles, the fabric finished with the two TPMA/CA formulations show better tensile strength, tearing strength and flex abrasion resistance than that finished with both BTCA and DMDHEU.

TABLE 5

Formulation of the TPMA/CA, BTCA and DMDHEU systems

| Formulation | Component | Concentration (%) of Bath (w/w) |
|---|---|---|
| TPMA/CA (pH 2.4) | TPMA (100%) | 2.0 |
| | CA | 9.4 |
| | $NaH_2PO_2.H_2O$ | 6.8 |
| | $Na_3PO_4.12H_2O$ | 1.5 |
| | Mykon HD | 3.0 |
| | Wet 16 | 0.2 |
| TPMA/CA (ph 2.7) | TPMA (100%) | 2.0 |
| | CA | 9.4 |
| | $NaH_2PO_2.H_2O$ | 6.8 |
| | $Na_3PO_4.12H_2O$ | 3.0 |
| | Mykon HD | 3.0 |
| | Wet 16 | 0.2 |
| (BTCA) | BTCA | 8.6 |
| | $NaH_2PO_2.H_2O$ | 6.8 |
| | Mykon HD | 3.0 |
| | Wet 16 | 0.2 |
| DMDHEU | Permafresh EFC | 11.4 |
| | Mykon HD | 3.0 |
| | Protosil NYS | 3.0 |
| | Wet 16 | 0.2 |
| | Water | 82.4 |

TABLE 6

The conditioned wrinkle-recovery angle, tensile strength retention, tearing strength retention and flex abrasion resistance of the cotton fabric finished with different systems in the presence of the softeners before washing.

| Sample | Finishing System | Curing Temperature (° C.) | Curing Time (min) | WRA (W + F) Angle | DP Rating | Tearing Strength Retention (%) W | F | Tensile Strength Retention (%) W | F | Flex Abrasion Resistance W | F |
|---|---|---|---|---|---|---|---|---|---|---|---|
| C1 | TPMA/CA (pH = 2.4) | 185 | 3.0 | 285 | 4.1 | 93 | 75 | 65 | 44 | 176 | 750 |
| C2 | TPMA/CA (pH = 2.7) | 185 | 3.0 | 283 | 4.1 | 97 | 83 | 62 | 46 | 228 | 880 |
| C3 | BTCA | 180 | 2.0 | 303 | 4.2 | 99 | 74 | 62 | 43 | 174 | 680 |
| C4 | DMDHEU | 170 | 3.0 | 261 | 3.6 | 100 | 77 | 53 | 43 | 226 | 824 |
| Control | — | 185 | 3.0 | 176 | 1.0 | 100 | 100 | 100 | 100 | 338 | 1317 |

TABLE 7

The tensile strength retention, tearing strength retention and flex abrasion resistance of the cotton fabric finished with different systems after 30 HLWD cycles

| Sample | Finishing System | Tearing Strength Retention (%) W | F | Tensile Strength Retention (%) W | F | Flex Abrasion Resistance W | F |
|---|---|---|---|---|---|---|---|
| C1 | TPMA/CA (pH = 2.4) | 73 | 70 | 63 | 52 | 221 | 1082 |
| C2 | TPMA/CA (pH = 2.7) | 75 | 71 | 64 | 55 | 343 | 1119 |
| C3 | BTCA | 64 | 59 | 64 | 49 | 195 | 923 |
| C4 | DMDHEU | 56 | 55 | 54 | 49 | 229 | 820 |

The Laundering Durability of the Finished Cotton Fabric

Tables 8 and 9 below summarize the laundering durability of the cotton fabric treated with different finishing systems. After the 30 washing/drying cycles, the WRA of the TPMA/CA-treated fabric is still 20 degree higher than the DMDHEU-treated fabric (Table 8). The appearance smoothness of the PMA/CA-treated fabric is also higher than the DMDHEU-treated fabric after the washing/drying process (Table 9). The data indicate that the cotton fabric treated with the TPMA/CA system shows satisfactory home laundering durability, and maintains higher DP performance and mechanical strength than the DMDHEU-treated fabric after the 30 HLWD cycles.

TABLE 8

WRA of the Cotton Fabric Treated with different Finishing Systems during 30 HLWD Cycles

| Sample | Finishing System | Number of HLWD Cycles 0 | 5 | 10 | 20 | 30 |
|---|---|---|---|---|---|---|
| C1 | TPMA/CA (pH = 2.4) | 285 | 276 | 263 | 255 | 250 |
| C2 | TPMA/CA (pH = 2.7) | 283 | 267 | 250 | 249 | 247 |
| C3 | BTCA | 303 | 281 | 266 | 262 | 262 |
| C4 | DMDHEU | 261 | 245 | 247 | 226 | 226 |

TABLE 9

DP Rating of the Cotton Fabric Treated with different Finishing Systems during 30 HLWD Cycles

| Sample | Finishing System | Number of HLWD Cycles 0 | 5 | 10 | 20 | 30 |
|---|---|---|---|---|---|---|
| C1 | TPMA/CA (pH = 2.4) | 4.1 | 3.9 | 3.7 | 3.4 | 3.4 |
| C2 | TPMA/CA (pH = 2.7) | 4.1 | 3.6 | 3.4 | 3.3 | 3.2 |
| C3 | BTCA | 4.2 | 3.8 | 3.7 | 3.6 | 3.5 |
| C4 | DMDHEU | 3.6 | 3.1 | 3.1 | 3.0 | 3 |

The Performance of the Finished Cotton Fabric: Garment Finishing

The finish formulations for the TPMA/CA system and the DMDHEU system used for the garment finishing is summarized in Table 10.

The comparison between the performance of the cotton pant-legs treated with the TPMA/CA system and that of the garment treated with the DMDHEU-based system are summarized in Table 11. It clearly indicates that the garment treated with the TPMA/CA system has both higher wrinkle-resistance and better mechanical properties (tensile strength, tearing strength, and flex abrasion resistance) than that treated with the conventional DMDHEU-based finish system.

TABLE 10

The Formulation of the TPMA/CA, and DMDHEU systems Used for Garment Finishing

| The Finish System | The Components | Concentration (%) of Bath, W/W |
|---|---|---|
| TPMA/CA (ph = 2.4) | TPMA (100%) | 2.0 |
|  | CA | 9.4 |
|  | $NaH_2PO_2 \pm H_2O$ | 6.8 |
|  | $Na_3PO_4 \pm 12H_2O$ | 1.5 |
|  | Mykon HD | ~3.0 |
|  | Discosoft WRS | 4.0 |
|  | Wet 16 | 0.2 |
| TPMA/CA (ph = 2.7) | TPMA (100%) | 2.0 |
|  | CA | 9.4 |
|  | $NaH_2PO_2 \pm H_2O$ | 6.8 |

TABLE 10-continued

The Formulation of the TPMA/CA, and DMDHEU systems Used for Garment Finishing

| The Finish System | The Components | Concentration (%) of Bath, W/W |
|---|---|---|
|  | Na$_3$PO$_4 \pm$ 12H$_2$O | ~3.0 |
|  | Mykon HD | 3.0 |
|  | Discosoft WRS | 4.0 |
|  | Wet 16 | 0.2 |
| DMDHEU | Discores LFR | 12.0 |
|  | Discosoft NIP | 3.0 |
|  | Discosoft WRS | 4.0 |
|  | Callaterge CNN | 0.1 |

TABLE 11

Comparison of Performance of Garment Treated with Different Finishing Systems

| Finishing System | Curing Temp. (° C.) | Curing Time (Min) | Conditioned Wrinkle Recovery Angle (W + F, degree) Before Wash | After 10 HLWD cycles | Tensile Strength Retention (%) W | Tensile Strength Retention (%) F | Tear Strength Retention (%) W | Tear Strength Retention (%) F | Flex Abrasion Resistance W | Flex Abrasion Resistance F |
|---|---|---|---|---|---|---|---|---|---|---|
| TPMA/CA (pH = 2.4) | 165 | 8 | 327 | 290 | 54 | 39 | 78 | 76 | 110 | 677 |
| TPMA/CA (pH = 2.7) | 165 | 8 | 322 | 291 | 53 | 47 | 83 | 83 | 146 | 795 |
|  | 165 | 10 | 327 | 287 | 59 | 42 | 84 | 84 | 107 | 598 |
|  | 170 | 6 | 330 | 282 | 57 | 41 | 74 | 79 | 120 | 736 |
| DMDHEU | 160 | 8 | 290 | 274 | 38 | 32 | 57 | 53 | 102 | 443 |
| Control | — | — | 198 | — | 100 | 100 | 100 | 100 | 309 | 467 |

The Performance of the Treated Kraft Paper

Kraft paper was treated with solutions containing citric acid (CA) and poly(maleic acid) (PMA) of different ratios with a total concentration of 6% and the catalyst. The treated paper samples were cured at 170° C. for 2 min. The dry tensile strength (D), wet tensile strength (W), and percentage wet strength retention ([W/D]×100) of the kraft paper treated with the solutions of different CA-to-PMA ratio are presented in Table 12. The treatment of the paper had little effect on the dry strength of the paper. However, the wet strength of the treated paper was significantly increased. By combining CA with PMA the performance of the treated paper is enhanced. When the acid solution contains 20 of PMA, the wet strength retention increases from 51.2% to 63.1%. Further increasing the percentage of PMA in the acid mixture has less drastic effect on the wet performance of treated paper. It was observed that folding endurance was decreases for the treated paper.

TABLE 12

The dry strength, wet strength, wet strength retention (W/D %), and folding endurance of the kraft paper treated with CA/PMA solutions of different CA-to-PMA ratio and cured at 170° C. for 2 min

| CA-to-PMA Ratio (W/W) | Control* | 1:0 | 4:1 | 2:1 | 1:1 | 1:2 | 1:4 | 0:1 |
|---|---|---|---|---|---|---|---|---|
| % PMA of Total Acid (W/W) | — | 0 | 20 | 33 | 50 | 67 | 75 | 100 |
| Dry Strength (kg) | 7.53 | 7.66 | 7.24 | 7.35 | 7.25 | 7.59 | 7.65 | 7.79 |
| Wet Strength (kg) | 0.67 | 3.92 | 4.57 | 5.07 | 5.19 | 5.55 | 5.75 | 5.99 |
| W/D (%) | 13.8 | 51.2 | 63.1 | 69.0 | 71.6 | 73.1 | 75.2 | 76.9 |
| Folding Endurance | 327 | 31 | 16 | 8 | 7 | 6 | 6 | 6 |

*Control was treated with water and cured at the same temperature.

Effect of Total Acid Concentration

The kraft paper samples were treated with the solutions containing the combination of PMA and CA with 4:1 CA-to-PMA ratio and the catalyst. The total acid concentration ranges from 0.5 to 8.0% (W/W). The treated paper samples were cured at 170° C. for 2 min. The dry tensile strength, wet tensile strength, percentage wet strength retention, dimensional stability, and folding endurance are presented in Table 11. It can be seen from Table 11 that an increase in the total acid concentration caused significant improvement in the wet strength, wet strength retention and dimensional stability of the treated paper. The increase in the paper wet performance was accompanied by considerable reduction in the folding endurance, especially at high acid add-on levels. Moderate improvement in paper wet performance can be achieved without significant loss in folding endurance at low acid add-on levels, such as the paper treated with the solution of 2% total acid concentration (Table 13).

TABLE 13

The dry strength, wet strength, wet strength retention, dimensional stability, and folding endurance of the kraft paper treated with CA/PMA solutions* of different concentrations and cured at 170° C. for 2 min

| Paper Property | Total Acid Concentration (%, W/W) | | | | | | |
|---|---|---|---|---|---|---|---|
| | 0.0 | 0.5 | 1.0 | 2.0 | 4.0 | 6.0 | 8.0 |
| Dry Strength (kg) | 7.53 | 7.18 | 7.08 | 7.34 | 7.61 | 7.24 | 7.62 |
| Wet Strength (kg) | 1.04 | 1.48 | 1.62 | 2.56 | 3.68 | 4.57 | 5.10 |
| W/D % | 13.8 | 20.6 | 22.9 | 34.9 | 48.4 | 63.1 | 66.9 |
| Dimensional Stability (%) | 9.1 | 12.8 | 20.5 | 31.8 | 43.0 | 50.2 | 58.7 |
| Folding Endurance (time) | 327 | 319 | 285 | 172 | 36 | 19 | 7 |

*All the solutions have a 4:1 CA-to-PMA ratio and contain the catalyst.

Effect of Softeners

The folding endurance of the treated paper can be improved by addition of softeners such as glycerine to the acid solution. Presented in Table 14 are the dry tensile strength, wet tensile strength, percentage wet strength retention, and folding endurance of the paper treated using two CA/PMA solutions with and without glycerine. It can be seen that the use of glycerine moderately reduced the wet strength whereas it significant improved the folding endurance of the treated paper.

TABLE 14

The dry strength, wet strength, wet strength retention, dimensional stability, and folding endurance of the kraft paper treated with the CA/PMA solutions* with or without the softener and cured at 170° C. for 2 min

| glycerine Concentration (%, W/W) | Dry Strength (kg) | Wet Strength (kg) | W/D (%) | Folding Endurance | Dimensional Stability |
|---|---|---|---|---|---|
| 0.0 | 7.41 | 5.48 | 74.0 | 6 | 71.7 |
| 20.0 | 6.88 | 3.31 | 48.1 | 205 | 41.3 |

*The two solutions contain the same total acid concentration of 6% and the same CA-to-PMA ratio of 2:1.

What is claimed is:

1. A composition for treating fibrous cellulosic material comprising:
   (A) one or more homopolymers consisting essentially of ethylenically unsaturated polycarboxylic acid monomers or salts thereof, the monomers having one or more dicarboxylic groups wherein the carboxyl groups are on adjacent carbon atoms; and
   (B) one or more saturated α-hydroxypolycarboxylic acids or salts thereof wherein at least two of the carboxyl groups are bonded to adjacent carbon atoms; and optionally;
   (C) one or more curing catalysts.

2. The composition of claim 1 wherein the weight ratio of polymer to α-hydroxypolycarboxylic acids is 1:0.1 to 1:20.

3. The composition of claim 1 wherein at least one saturated α-hydroxypolycarboxylic acids is selected from the group consisting of citric acid, malic acid, and tartrate acid monosuccinic acid.

4. The composition of claim 1 wherein the weight ratio of polymer to α-hydroxypolycarboxylic acid is 1:0.1 to 1:20, and the α-hydroxypolycarboxylic acid is citric acid or a salt thereof.

5. The composition of claim 1 wherein at least one of the curing catalysts is selected from the group consisting of alkali metal hypophosphites, alkali metal phosphites, alkali metal polyphosphates, alkali metal dihydrogen phosphates, alkali metal hydrogen phosphate, alkali metal phosphate and mixtures thereof.

6. The composition of claim 1 wherein the one or more homopolymers is a homopolymer of maleic acid.

7. The composition of claim 6 wherein the α-hydroxypolycarboxylic acid is citric acid.

8. A composition for treating fibrous cellulosic material comprising:
   (A) one or more homopolymers consisting essentially of ethylenically unsaturated polycarboxylic acid monomers or salts thereof, the monomers having one or more dicarboxylic groups wherein the carboxyl groups are on adjacent carbon atoms; and
   (B) one or more saturated α-hydroxypolycarboxylic acids or salts thereof wherein at least two of the carboxyl groups are bonded to adjacent carbon atoms; and optionally
   (C) one or more curing catalysts; wherein the polymers and the α-hydroxypolycarboxylic acids are admixed to form a dry blend.

9. A composition for treating fibrous cellulosic material comprising:
   (A) one or more homopolymers consisting essentially of ethylenically unsaturated polycarboxylic acid monomers or salts thereof, the monomers having one or more dicarboxylic groups wherein the carboxyl groups are on adjacent carbon atoms; and
   (B) one or more saturated α-hydroxypolycarboxylic acids or salts thereof wherein at least two of the carboxyl groups are bonded to adjacent carbon atoms; and optionally
   (C) one or more curing catalysts; wherein the polymers and the α-hydroxypolycarboxylic acids are dispersed in an aqueous medium.

10. A composition for treating fibrous cellulosic material comprising:
    (A) one or more polymers comprising greater than 60% of ethylenically unsaturated polycarboxylic acid monomers or salts thereof, the monomers having one or more dicarboxylic groups wherein the carboxyl groups are on adjacent carbon atoms; and
    (B) one or more saturated α-hydroxypolycarboxylic acids or salts thereof wherein at least two of the carboxyl groups are bonded to adjacent carbon atoms; and optionally
    (C) one or more curing catalysts.

11. The composition of claim 10 wherein the polymers and the α-hydroxypolycarboxylic acids are dispersed in an aqueous medium.

12. The composition of claim 10 wherein the polymers and the α-hydroxypolycarboxylic acids are admixed to form a dry blend.

13. The composition of claim 10 wherein the weight ratio of polymer to α-hydroxypolycarboxylic acids is 1:0.1 to 1:20.

14. The composition of claim 10 wherein at least one saturated α-hydroxypolycarboxylic acid is selected from the group consisting of citric acid, malic acid, and tartrate acid monosuccinic acid.

15. The composition of claim 10 wherein at least one curing catalyst is selected from the group consisting of alkali metal hypophosphites, alkali metal phosphites, alkali metal polyphosphates, alkali metal dihydrogen phosphates, alkali metal hydrogen phosphate, alkali metal phosphate and mixtures thereof.

16. The composition of claim 10 wherein the polymers have the formula:

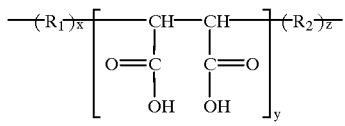

wherein $R_1$ and $R_2$ independently are H, C1–5 alkyl, substituted or unsubstituted, and x and z are positive rational numbers or 0, y is a positive rational number and x+y+z=1; and (B) one or more saturated α-hydroxypolycarboxylic acids or salts thereof wherein at least two of the carboxyl groups are bonded to adjacent carbon atoms; and optionally (C) one or more curing catalysts.

17. The composition of claim 16 wherein the polymer is a hydrolyzed copolymer of maleic anhydride.

18. The composition of claim 16 wherein $R_1$ is a residue of acrylic acid or an ester thereof, $R_2$ is a residue of vinyl monomers other than acrylic acid or an ester thereof, and y is 0.5 to 0.9.

19. The composition of claim 18 wherein $R_1$ is a residue of acrylic acid or ethyl acrylate, and $R_2$ is a residue of vinyl acetate.

20. The composition of claim 19, wherein the weight ratio of polymer to α-hydroxypolycarboxylic acids is 1:0.1 to 1:20, and at least one saturated α-hydroxypolycarboxylic acids is selected from the group consisting of citric acid, malic acid, and tartrate acid monosuccinic acid.

21. The composition of claim 19 wherein the polymer has a weight ratio of maleic acid to ethyl acrylate to vinyl acetate of about 6:1:1, the weight ratio of polymer to α-hydroxypolycarboxylic acid is 1:0.1 to 1:20, and the saturated α-hydroxypolycarboxylic acid is citric acid or a salt thereof.

22. The composition of claim 10 wherein the one or more polymers is a copolymer of maleic acid.

23. The composition of claim 22 wherein the α-hydroxypolycarboxylic acid is citric acid.

* * * * *